United States Patent
Tsengas

(10) Patent No.: US 7,926,450 B1
(45) Date of Patent: Apr. 19, 2011

(54) METHOD FOR APPLICATION OF AROMA THERAPY FOR A FELINE

(75) Inventor: Steven Tsengas, Fairport Harbor, OH (US)

(73) Assignee: Ourpet's Co., Fairport Harbor, OH (US)

( * ) Notice: Subject to any disclaimer, the term of this patent is extended or adjusted under 35 U.S.C. 154(b) by 1680 days.

(21) Appl. No.: 11/072,750

(22) Filed: Mar. 4, 2005

(51) Int. Cl.
*A01K 29/00* (2006.01)

(52) U.S. Cl. ....................................... 119/711; 119/707

(58) Field of Classification Search .................. 119/711, 119/707, 710, 708, 709
See application file for complete search history.

(56) References Cited

U.S. PATENT DOCUMENTS

| | | | | |
|---|---|---|---|---|
| 2,086,631 | A * | 7/1937 | Munro | 119/711 |
| 2,473,574 | A * | 6/1949 | Davis | 446/243 |
| 5,009,193 | A * | 4/1991 | Gordon | 119/711 |
| 5,778,825 | A * | 7/1998 | Krietzmen et al. | 119/708 |
| 6,237,538 | B1 | 5/2001 | Tsengas | |
| 6,415,741 | B2 * | 7/2002 | Suchowski et al. | 119/711 |
| 2002/0174838 | A1* | 11/2002 | Crane et al. | 119/707 |
| 2004/0237905 | A1* | 12/2004 | Tsengas | 119/711 |

* cited by examiner

*Primary Examiner* — T. Nguyen
(74) *Attorney, Agent, or Firm* — John D. Gugliotta, PE, Esq

(57) ABSTRACT

An aroma therapy kit for a feline comprises the combination of a housing, at least one retention element disposed inside the housing, and at least one additive delivered to the at least one retention element. It is further envisioned that multiple retention elements and/or multiple additives may be provided in the kit to provide greater versatility and choice to the scents or fragrances used as aroma therapy with the apparatus.

14 Claims, 3 Drawing Sheets

METHOD FOR APPLICATION OF AROMA THERAPY FOR A FELINE

RELATED APPLICATIONS

There are no previously filed, nor currently any co-pending applications, anywhere in the world.

BACKGROUND OF THE INVENTION

1. Field of the Invention

The present invention relates generally to a method for providing aroma therapy to a feline, and, more particularly, to a method, system or kit that provides aroma therapy to a feline utilizing a housing, a retention element and scented additives.

2. Description of the Related Art

As is well known in the art, there are many pet toys that are used to engage a pet in physical activity. Several devices employ the use of aromas or scents as attractants or enhancements of the toy, including the use of stuffed toys having catnip embedded therein. However, there does not appear to be a kit providing a method for delivering aroma therapy to a feline in the manner provided for in the present invention.

Consequently, a need has been felt for providing an apparatus and method for delivering aroma therapy to a feline.

SUMMARY OF THE INVENTION

It is therefore an object of the present invention to provide a method and kit for delivering aroma therapy to a feline.

It is a feature of the present invention to provide a kit having an improved pet toy.

As described in one embodiment of the present invention, an aroma therapy kit for a feline comprises the combination of a housing, at least one retention element disposed inside the housing, and at least one additive delivered to the at least one retention element. It is further envisioned that multiple retention elements and/or multiple additives may be provided in the kit to provide greater versatility and choice to the scents or fragrances used as aroma therapy with the apparatus.

The housing has a first component coupled to a second component. The first component and the second component form an internal space for retaining the retention element. The first component and the second component have a plurality of apertures in fluid communication with the internal space and the retention element retained therein. The apertures allow the scent, fragrance or odor to externally escape so that a feline or felines can smell the scent provided.

The retention element comprises a fibrous material or a porous material, or a combination of fibrous and porous material. The retention element may comprise cotton, sponge, paper or other suitable material for retaining the additive.

The additive is housed in a dispenser. The additive is distributed from the dispenser onto the retention element. The additive may comprise catnip, lavender, or any other stimulative scent or fragrance that may be retained by the retention element within the housing for transmission to a feline(s) during engagement with the apparatus.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
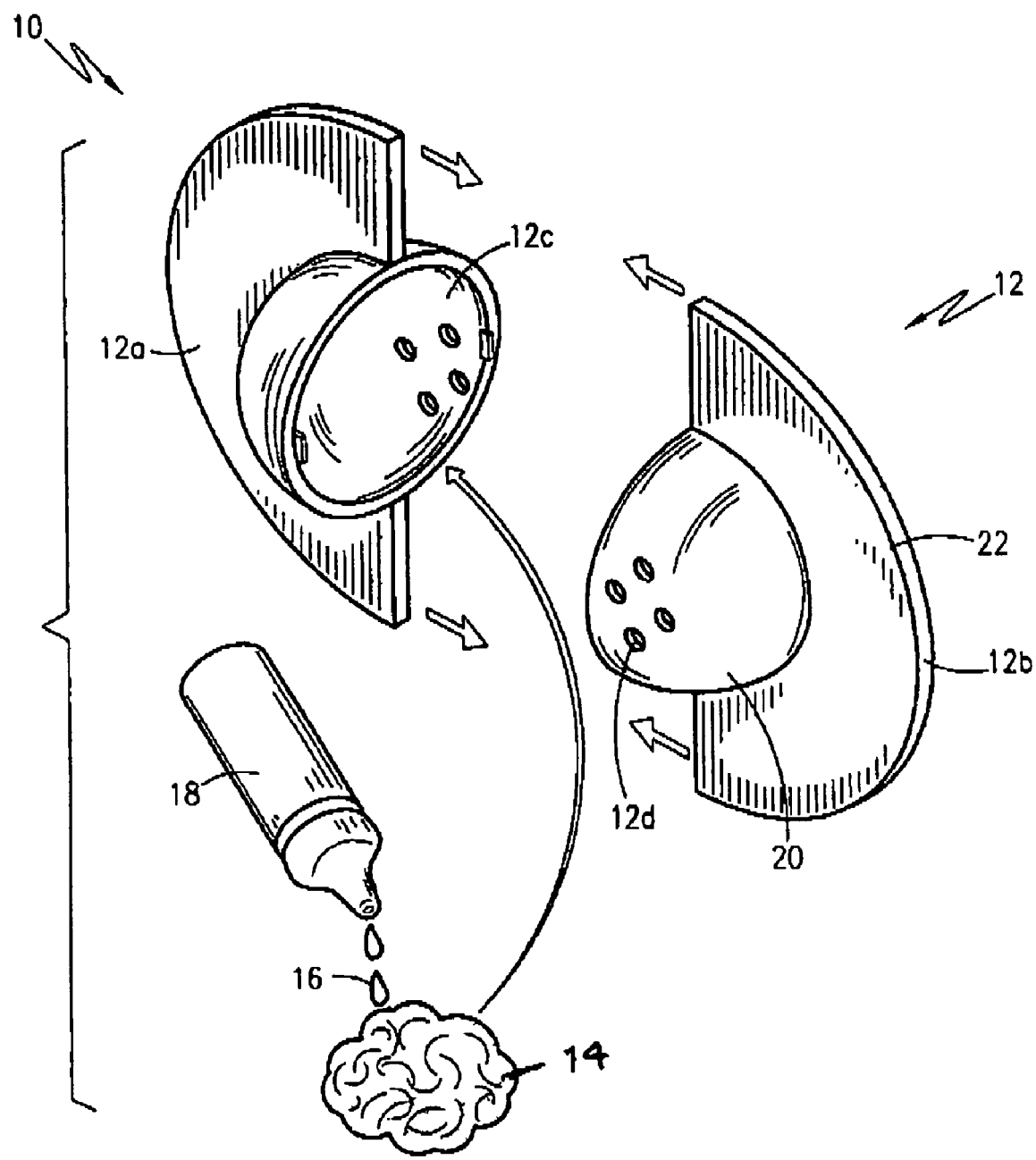
FIG. 1 is an exploded perspective of the kit of the present invention.
Figure 2A:
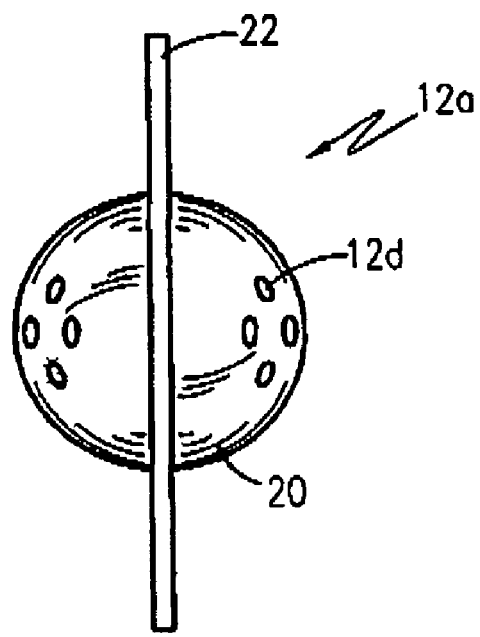
FIG. 2a is a top view of the housing.
Figure 2B:
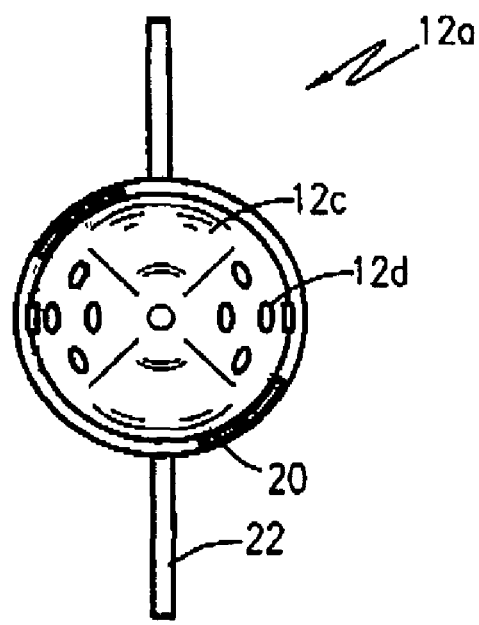
FIG. 2b is a bottom view of the housing.
Figure 3:
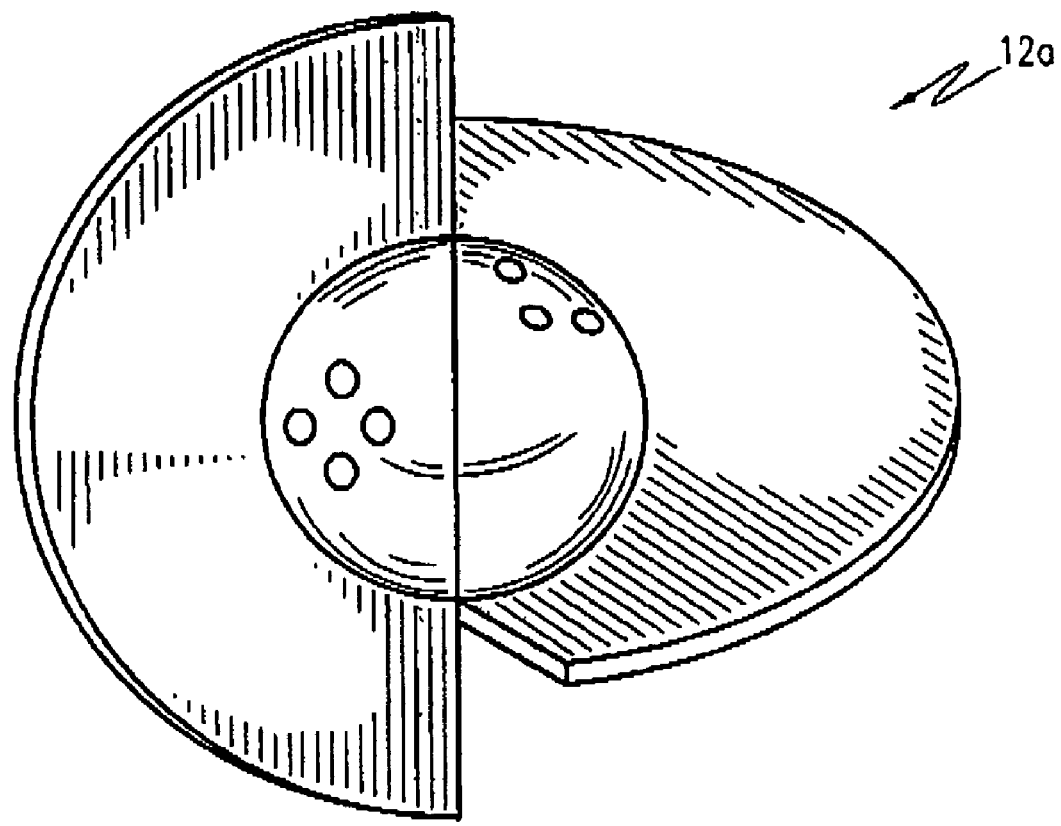
FIG. 3 is an exploded perspective of an alternate embodiment of the kit.
Figure 3:
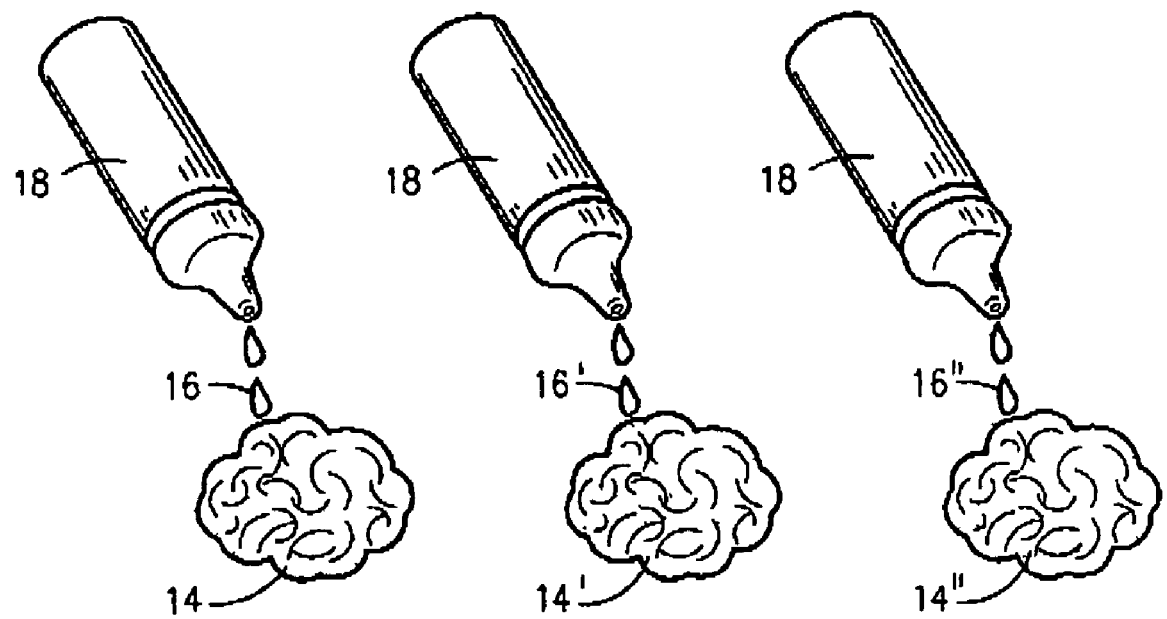

The best mode for carrying out the invention is presented in terms of its preferred embodiment, herein depicted within the FIGS. 1-3.

1. Detailed Description of the Figures

Referring now to FIG. 1, an aroma therapy kit 10 for a feline is depicted in accordance with a preferred embodiment of the present invention. The kit 10 comprises the combination of a housing 12, at least one retention element 14 disposed inside the housing 12, and at least one additive 16 delivered to the at least one retention element 14. The kit 10 enables one to arrange the housing 12 and the at least one retention element 14 to release a scented or fragrant smell and provide aroma therapy to a feline engaging the apparatus disposed in the kit 10.

The housing 12 comprises a first component 12a coupled to a second component 12b. The first component and the second component form an internal space 12c for retaining the retention element 14 described above. The first component and the second component have a plurality of apertures 12d in fluid communication with the internal space 12c and the retention element 14 retained therein. The apertures 12d allow the scent, fragrance or odor to externally escape so that a feline or felines can smell the scent provided.

As generally depicted in FIG. 1 through FIG. 3, the housing 12 may have several forms or geometries, including any polygonal shape or arrangement. In the embodiment depicted in the figures, the housing 12 has a first component 12a and a second component 12b that are mirror images of one another, so that a description of one component 12a or 12b serves as a representative description of the other remaining component 12a or 12b. For example, as depicted, the first component 12a comprises a substantially hemispherical body 20 having a semi-circular fin 22 formed along an external surface of the body 20 and co-planar to a midline "M-M" of the body 20. The fin 22 appears to divide the body 20 into two halves. The plurality of apertures 12d are formed along the surface of the body 20. Internally, the body 20 forms a bowl shape structure, and when coupled with the second component 12b (and the mirror image elements of the second component), forms the internal space 12c that retains retention element 14. Adjacent the bowl shape structure on the perimeter of the body 20 are ridges or threads that engage teeth or extensions, and thus allow the first component 12a and second component 12b to securely couple together. The components 12a and 12b are turned or twisted in the opposite direction so as to achieve interference impingement of the teeth against the ridges is realized. When coupled, the components 12a and 12b are arranged so that the respective fins 22 are offset between 0° and 90°, with the offset preferably between 30° and 60°. The offset of the fins 22 provides the apparatus with the ability to wobble, spin or flutter when swatted by a feline during the course of play or engagement. It is envisioned that the components 12a and 12b may be of the same or different colors, with the preference of each component 12a and 12b having a different color to provide contrast and the illusion of movement to the apparatus during play.

The retention element 14 comprises a fibrous material or a porous material, or a combination of fibrous and porous material. For instance, by way of example only and not as a limitation on the invention, the retention element 14 may comprise cotton, sponge, paper or other suitable material for retaining the additive 16.

The additive 16 is housed in a dispenser 18. The additive 16 is distributed from the dispenser 18 onto the retention element 14. The additive may comprise catnip, in the form of a diluted nepatalactone solution, lavender, or any other stimulative scent or fragrance that may be retained by the retention element 14 within the housing 12 for transmission to a feline(s) during engagement with the apparatus.

As depicted in FIG. 3, it is envisioned that the kit 10 may further comprise an additional retention element 14' or elements 14" so that a spent retention element may be replaced. In addition, and in combination with an additional additive 16' or additives 16", the retention elements 14, 14' and/or 14" that are provided may be segregated to correspond to the respective additives 16, 16' and/or 16" that is/are provided in the kit 10.

2. Operation of the Preferred Embodiment

To use the present invention, the retention element 14 is then disposed into the bowl shape of either the first component or the second component 12a and 12b. The additive 16 is delivered to the retention element 14. In one embodiment, delivery of the additive to the retention element 14 is achieved via a dispenser housing the additive 16. The remaining component 12a or 12b is then engaged with the other component and the first and second components are coupled. The scent or fragrance from the additive 16 fluidly moves through the apertures 12d so that a feline can smell the scent or fragrance and receive the intended aroma therapy.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An aromatherapy kit for felines comprising the combination of:
   a housing;
   at least one retention element disposed inside of said housing; and
   at least one additive delivered to said at least one retention element;
   wherein said at least one additive is a nepetalactone solution.

2. An aromatherapy kit for felines comprising the combination of:
   a housing having a first component coupled to a second component said first component and said second component offset so that said housing moves irregularly when engaged by a feline:
   at least one retention element disposed inside of said housing; and
   at least one additive delivered to said at least one retention element:
   wherein said at least one additive is nepetalactone solution.

3. The kit of claim 2 further comprising an additional retention element.

4. The kit of claim 2 further comprising an additional additive.

5. The kit of claim 1, wherein said housing comprises a first component coupled to a second component, said first component and said second component forming an internal space.

6. The kit of claim 5, wherein said first component and said second component have a plurality of apertures in fluid communication with said internal space.

7. The kit of claim 1, wherein said at least one retention element comprises a fibrous material.

8. The kit of claim 1, wherein said at least one retention element comprises a porous material.

9. The kit of claim 1, wherein said at least one additive is housed in a dispenser.

10. The kit of claim 2, wherein said housing comprises a first component coupled to a second component, said first component and said second component forming an internal space.

11. The kit of claim 10, wherein said first component and said second component have a plurality of apertures in fluid communication with said internal space.

12. The kit of claim 2, wherein said at least one retention element comprises a fibrous material.

13. The kit of claim 2, wherein said at least one retention element comprises a porous material.

14. The kit of claim 2, wherein said at least one additive is housed in a dispenser.

* * * * *